United States Patent
Muller

[15] 3,673,066
[45] June 27, 1972

[54] PROCESS FOR THE ACCELERATED OBTAINING OF TERPENIC OXIDES USING ULTRAVIOLET LIGHT

[72] Inventor: Pierre Muller, Nanterre, France

[73] Assignee: Laboratories De L'Ozothine, Nanterre, France

[22] Filed: Feb. 14, 1969

[21] Appl. No.: 799,520

[52] U.S. Cl. ................................. 204/162 R, 204/158 R
[51] Int. Cl. ............................................... B01j 1/10
[58] Field of Search .................... 204/162 R, 161, 158 R; 260/675.5

[56] References Cited

UNITED STATES PATENTS

| | | | |
|---|---|---|---|
| 1,253,793 | 1/1918 | Dedichen et al. | 204/162 X |
| 1,985,792 | 12/1934 | Meerwein et al. | 260/675.5 UX |
| 2,830,016 | 4/1958 | Cier et al. | 204/162 |
| 2,911,442 | 11/1959 | Bain et al. | 260/675.5 X |
| 3,278,623 | 10/1966 | Derfer | 260/675.5 |

FOREIGN PATENTS OR APPLICATIONS

| | | | |
|---|---|---|---|
| 1,097,118 | 12/1967 | Great Britain | 260/675.5 |

*Primary Examiner*—Benjamin R. Padgett
*Assistant Examiner*—Harvey E. Behren
*Attorney*—Sughrue, Rothwell, Mion, Zinn & Macpeak

[57] ABSTRACT

A process for the preparation of verbenone, myrtenol, myrtenal, trans-verbenol, cis-verbenol, pinocarveol, 3.01-2 pinene, α-pinene epoxide and campholene aldehyde comprising I. subjecting oil of turpentine to an intense oxidation step comprising continuously insufflating air through said oil at a temperature of about 70° C while agitating said oil and irradiating said oil with ultraviolet light in the presence of
  a. from 0.05 to 0.5 percent by weight of a promoter selected from the group consisting of organic salts and complexes of nickel, vanadium, tungsten, tantalum, niobium, rhenium, tellurium and selenium; and
  b. in the presence of from 1 to 10 percent by weight of at least one catalyst selected from the group consisting of
    1. the abietates, the levopimarates, the dextropimarates and the pinonates of cobalt, manganese and nickel; and
    2. a member selected from the group consisting of the acetylacetonates, the phthalocyanines and the terpenic acid salts of nickel, cobalt, vanadium, tungsten, tantalum, niobium and rhenium; the oxides of selenium and tellurium; the naphthenates, the oleates, and the stearates of cobalt, manganese and nickel; in the presence of from 0.05 to 0.5 percent by weight of at least one member selected from the group consisting of copper (II) salts, cesium salts and mixtures thereof;
II. distilling off the reaction products having a boiling point of about 75° C at 10 mmHg; and
III. rectifying the distilled reaction products collected, is disclosed.

2 Claims, No Drawings

PROCESS FOR THE ACCELERATED OBTAINING OF TERPENIC OXIDES USING ULTRAVIOLET LIGHT

The present invention concerns a new process for obtaining terpenic oxides and, in particular, verbenone, Myrtenol, Myrtenal, Trans-verbenol, Cis-verbenol, Pinocarveol, 3.01–2 Pinene.

Terpenic oxides have long been used in veterinary and human therapeutics, but their preparation from oxidation processes of the constituents of the natural oils of turpentine makes it essential that the oxidation operations should be carried out very delicately. The various conventional processes are long, complicated and difficult. Moreover, these processes result in terpenic oxides containing various contents of non-hydrosoluble bodies which it is necessary to eliminate by chemical means. The hydroperoxides formed in the course of these processes have therefore to be eliminated in the course of a subsequent operation.

The present invention therefore concerns a new, simple, rapid and economical process for obtaining the following compounds: verbenone, myrtenol, myrtenal, trans-verbenol, cis-verbenol, pinocarveol, 3.01–2 pinene, $\alpha$ - pinene epoxide, campholene aldehyde, characterized in that turpentine oil is subjected to an intense oxidation phase in the presence of the combination of at least one promoter selected from the organic salts or complexes of the following metals or metalloids: nickel, vanadium, tungsten, tantalium, niobium, rhenium, selenium or tellurium and at least on catalyst selected from the following group : abietate or levopimarate or dextropimarate or pinonate of cobalt or manganese or nickel, this phase being followed by a fractionated distillation by selection of products distilling above 75° under a pressure of 10 mm mercury, then a final phase of rectification by selection of products collected between 72 and 75° under 5 mm mercury.

Another object of the invention is to combine the action of the promoter-catalyst combination with continuous insufflation by a large supply of compressed air, the joint action of ultra-violet radiation, strictly constant and strong agitation and the maintaining of the temperature of the oil of turpentine at 70° during the entire oxidation phase.

Another object of the invention is to obtain a more constant yield, whilst extending the choice of the aforementioned catalysts to the following catalysts: acetyl-acetonates and phthalo-cyanines of nickel, cobalt, vanadium, tungsten, tantalium, niobium, rhenium, oxides of selenium or tellurium, naphthenates, oleates and stearates of metals such as cobalt or manganese or nickel in combining them with one of the aforementioned promoters in the presence of promoters: salts of $Cu^{++}$ and/or cesium.

In this manner a reliable, rapid and economical process is obtained, the advantages and features of which will be apparent from the following description:

According to the invention, the first phase or intense oxidation phase of the oil of turpentine is characterized by all the following conditions:

a. Continuous insufflation with a large supply of compressed air,
b. Action of light and particularly ultra-violet radiation,
c. The raising and maintaining of the temperature of the oil of turpentine at 70°,
d. Constant agitation of the products by means of an agitator rotating at 3,200 revolutions per minute, for example,
e. The presence, in a concentration of 1 – 10 percent of the total weight of one of the afore-mentioned oxidation catalysts, nickel pinonate, for example. Nickel pinonate may be obtained by mixing 18.5 g pinonic acid and 4 g sodium in 25 ml water. Sodium pinonate is formed. Then a solution is added containing 24 g nickel chloride ($Cl_2Ni$, $6 OH_2$) dissolved in 20 ml water: nickel pinonate is precipitated. It is sufficient to collect it by filtration and to dry it in vacuo,
f. The presence, in a concentration of 0.05 to 0.5 percent, of at least one of the salts or organic complexes of the following metals or metalloides : Nickel, vanadium, tungsten tantalium, niobium, rhenium, selenium or tellurium, for example: selenium oxide.

These operating conditions make it possible to assist the oxidation reactions whilst destroying the undesirable hydroperoxides, thus avoiding the subsequent destruction operation by chemical means which was necessary in previous processes. Moreover, a maximum amount of terpenic oxides is obtained in a relatively very short period, since it corresponds to a reduction of time of the order of 85 percent compared with previous processes or, to underline the point, less than 40 hours instead of 8 to 10 days.

Furthermore, this result was discovered without expecting that under the effect of this intense oxidation with destruction of the undesirable hydroperoxides, the phenomena of thermal decomposition being produced in the course of distillation are completey reduced and that the acidity of the products obtained and the quantity of tars formed in the distillation vat are minimal. Consequently only a single distillation is necessary to obtain products capable of being directly used in pharmaceutical therapeutics.

The second phase thus corresponds to a single fractionated distillation under reduced pressure of the oxidized oil of turpentine. The untransformed $\alpha$ and $\beta$ pinenes are first distilled and then the fraction is collected which distills above 75° under pressure of 10 mm mercury.

It should be noted that the product collected may be immediately used in all pharmaceutical forms with the exclusion of the injectable solutions and that the processes of purification by chemical means required with previous methods are avoided.

The third phase is intended for the obtaining of practically neutral terpenic oxides, enriched with carbonyl derivatives, which can be directly employed in pharmaceutical therapeutics, either in a pure state or in a state combined with various compounds. The product, pure or combined, may be used in all its forms, including injectable solutions intended for intramuscular or intra-venous administration.

For this purpose, the fraction previously isolated in the course of the second phase, is rectified between 72 and 75° under a reduced pressure of 5 mm mercury. A product is collected which no longer needs to be chemically treated.

The present invention thus makes it possible to obtain, by a rapid, economical and reliable process, terpenic oxides enriched or not enriched with carbonyl products and capable of use immediately in pharmaceutical therapeutics.

However, according to the present invention it is possible to replace nickel pinonate with cobalt or manganese pinonate or by the following: levopimarate, dextropimarate, cobalt, nickel or manganese abietate.

Similarly, in order to improve the regularity of the operations and to obtain a constant yield, it is possible to use, in addition to the aforementioned catalysts, terpenic acid salts, acetyl-acetonates and phthalo-cyanines of nickel, cobalt, vanadium, tungsten, tantlium, niobium, rhenium, oxides of selenium or tellurium, tantalium, oleates and stearates of metals such as cobalt or manganese or nickel, combining them with one of the afore-mentioned promoters in the presence of the promoters: salts of $Cu^{++}$ and/or cesium, the concentration of the promoters $Cu^{++}$ and cesium also varying from 0.05 to 0.5 percent.

Thus, starting from an oil or essence of turpentine, called Bordeaux essence, comprising as constituents: approximately 70 29 percent of (—) $\alpha$ - pinene and approximately 25 percent of (—) $\beta$ - pinene, the following mixture results: verbenone 25 to 30 percent, myrtenol and pinocarveol 7 to 12 percent, myrtenal 5 to 6 percent, trans-verbenol, cis-verbenol and 3.01–2 pinene, 45–50 percent, pinene epoxide and campholene aldehyde, 5 percent.

These bodies were obtained by selecting, as catalysts, nickel pinonate in the presence of copper sulphate with respective concentration of 10 percent and 0.1 percent.

Similar results were obtained by selecting cobalt abietate as catalysts at a rate of 8 percent and nickel pinonate as promoter: 0.3 percent.

Similarly it was possible to replace cobalt abietate in the foregoing example by acetyl-acetonate of cobalt: 5 percent, by using as promoter a 0.3 percent nickel pinonate in the presence of 0.1 percent copper sulphate.

Tests have shown that from the start of this oxidation phase, hydroperoxides are formed on the ethylene compounds and peroxides on the aldehyde functions or ketones produced in the medium. These peroxides may act on the campholene aldehyde to give radical cyclizations leading to ketones of the camphor or dihydrocamphenone type which are formed in a very small quantities.

In addition to the acceleration of the oxidation reactants and the destruction of the hydroperoxides a regularization of the reactions was discovered ensuring a yield from the operations which is both better and more constant.

After oxidation and in the course of the following phase of fractionated distillation under reduced pressure the phenomena of thermal decomposition are reduced with the result that the residues formed in the distillation vat appear in only very small quantities. Only the products are eliminated which are first distilled and which contain pinenes which have not yet been oxidized, as also a small quantity of formic acid and acetic acid, formed in the course of the preceding oxidation operation. Then the fraction is collected which distills above 75° under a pressure of 10 mm mercury. The action of the already mentioned catalysts with one or more aforesaid promoters, makes it possible to reduce to the minimum the reject from the initial distillation. In this manner the above-listed bodies are obtained, the terpenic products of resinification which are unsuitable for pharmaceutical use remaining in the distillation vat.

Finally, greater speed is achieved in the transformation of the essences of oxygenated terpenic derivatives, a more complete transformation, a more constant yield and, during the distillation, a greater quantity of products capable of direct use in pharmaceutical therapeutics.

What we claim is:

1. A process for the preparation of verbenone, myrtenol, myrtenal, trans-verbenol, cis-verbenol, pinocarveol, 3.01–2.0 pinene, α-pinene oxide and campholene aldehyde, which comprises:

1. subjecting oil of turpentine to an intense oxidation step, which comprises continuously insufflating air through said oil at a temperature of about 70° C., while agitating said oil and irradiating said oil with ultraviolet light in the presence of from 1.0 to 10.0 percent, by weight, of a catalyst selected from the group consisting of the abietates, levopimarates, dextropimarates, and pinonates of cobalt, manganese and nickel, 0.3 percent, by weight, of one of the aforementioned abietates, levopimarates, dextropimarates and pinonates of nickel, as a promoter, and from 0.05 to 0.5 percent of a second promoter selected from the group consisting of a copper (II) salt and a cesium salt,
   2. distilling off the reaction products having a boiling point of about 75° C. at 10 mm Hg, and
   3. rectifying the distilled reaction products collected.

2. The process of claim 1, wherein said catalyst members are replaced by a member selected from the group consisting of the acetylacetonates, phthalocyanines, and terpenic acid salts of nickel, cobalt, vanadium, tungsten, tantalum, niobium and rhenium, the oxides of selenium and tellurium, and the naphthenates, oleates and stearates of cobalt, manganese and nickel.

* * * * *